United States Patent
Blum et al.

(10) Patent No.: US 10,474,126 B2
(45) Date of Patent: Nov. 12, 2019

(54) SELF-PROPELLED FASTENING UNIT AND METHOD FOR FASTENING SEALING WEBS

(71) Applicant: SFS intec Holding AG, Heerbrugg (CH)

(72) Inventors: Kurt Blum, Koblach (AT); Daniel Gasser, Diepoldsau (CH); Thomas Heinzmann, St. Gallen (CH)

(73) Assignee: SFS intec Holding AG, Heerbrugg (CH)

( * ) Notice: Subject to any disclaimer, the term of this patent is extended or adjusted under 35 U.S.C. 154(b) by 21 days.

(21) Appl. No.: 15/968,206

(22) Filed: May 1, 2018

(65) Prior Publication Data

US 2018/0348731 A1    Dec. 6, 2018

(30) Foreign Application Priority Data

May 30, 2017 (EP) .................................. 17173390

(51) Int. Cl.
*G05B 19/402*    (2006.01)
*B29C 65/36*    (2006.01)
(Continued)

(52) U.S. Cl.
CPC ........ *G05B 19/402* (2013.01); *B29C 65/3656* (2013.01); *B29C 65/3676* (2013.01); *B29C 66/0342* (2013.01); *B29C 66/1122* (2013.01); *B29C 66/474* (2013.01); *B29C 66/86521* (2013.01); *B29C 66/944* (2013.01); *B29C 66/98* (2013.01); *E04D 5/147* (2013.01);
(Continued)

(58) Field of Classification Search
None
See application file for complete search history.

(56) References Cited

U.S. PATENT DOCUMENTS 8,312,605 B1 * 11/2012 Rider ...................... E04D 3/364
29/243.5
8,322,014 B1 * 12/2012 Rider .................. B21D 39/023
29/243.58
(Continued)

FOREIGN PATENT DOCUMENTS

| DE | 19824726 | 8/1999 |
| FR | 2318985 | 2/1977 |
| WO | 2014072324 | 5/2014 |

*Primary Examiner* — Ryan A Jarrett
(74) *Attorney, Agent, or Firm* — Volpe and Koenig, P.C.

(57) ABSTRACT

A method for fastening material webs, such as roofing sheets made of plastic on a surface with fastening points (head disks including a hot-melt adhesive layer) arranged thereon using a self-propelled fastening unit (20) comprising the following steps: (A) detecting a route marking by means of a first detector (22) on the fastening unit (20) and moving the fastening unit along the route marking; (B) detecting and calculating the position of a head disk (14) by means of a second detector (24); (C) approaching and remaining at an operating position during the subsequent fastening process; (D) positioning an induction heater (30) and heating up the head disk (14) for a period of time Th; (E) removing the induction heater (30) and pressing the material web against the head disk by a cooling device (32); (F) taking off the cooling device after a predetermined time Tk has passed; (G) continuing with (A), until an end of the route marking is reached.

14 Claims, 1 Drawing Sheet

(51) Int. Cl.
*B29C 65/00* (2006.01)
*E04D 15/04* (2006.01)
*E04D 5/14* (2006.01)
*B29L 31/10* (2006.01)

(52) U.S. Cl.
CPC .............. *E04D 15/04* (2013.01); *B29C 66/21* (2013.01); *B29C 66/8181* (2013.01); *B29L 2031/108* (2013.01); *G05B 2219/37217* (2013.01); *G05B 2219/49032* (2013.01)

(56) References Cited

U.S. PATENT DOCUMENTS

| | | | | |
|---|---|---|---|---|
| 2002/0074084 | A1* | 6/2002 | Pfotenhauer | B29C 66/86521 156/304.1 |
| 2002/0074088 | A1* | 6/2002 | Pfotenhauer | B29C 66/1122 156/391 |
| 2008/0066871 | A1* | 3/2008 | Gisler | B29C 66/1122 156/497 |
| 2010/0071298 | A1* | 3/2010 | Krawcheck | E04D 3/364 52/588.1 |
| 2012/0267052 | A1* | 10/2012 | Burgess | E04D 15/04 156/391 |
| 2015/0284960 | A1 | 10/2015 | Bleibler | |
| 2018/0015676 | A1* | 1/2018 | Loetscher | B29C 65/10 |

* cited by examiner

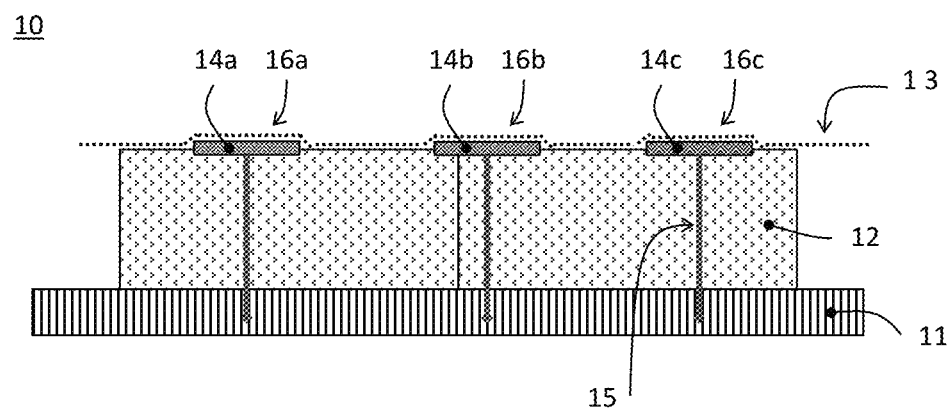
Fig. 1 – Prior Art
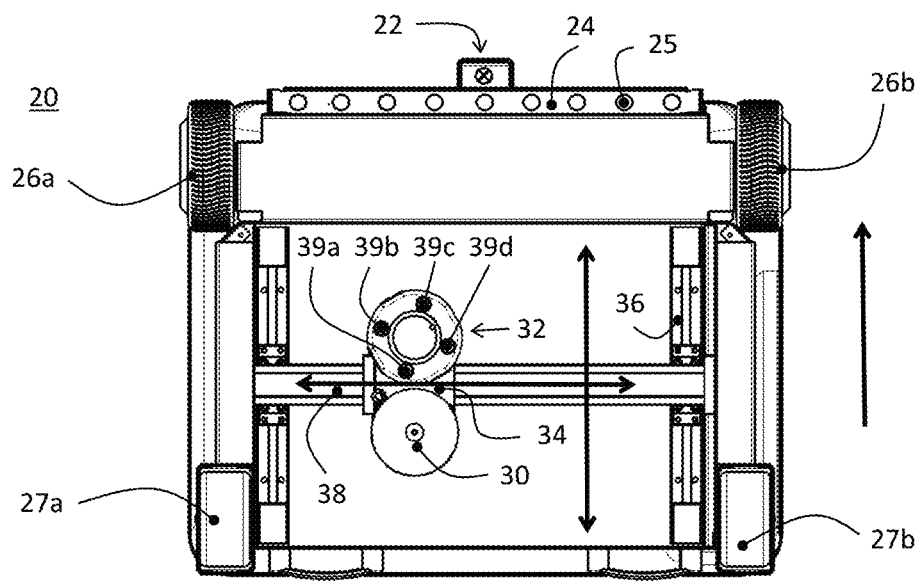
Fig. 2

SELF-PROPELLED FASTENING UNIT AND METHOD FOR FASTENING SEALING WEBS

INCORPORATION BY REFERENCE

The following documents are incorporated herein by reference as if fully set forth: European Patent Application No. 17173390.0, filed May 30, 2017.

FIELD OF THE INVENTION

The present invention deals with a self-propelled fastening unit, which is designed to locate and to weld fastening points of roofing sheets, roofing films or sealing webs, respectively, in a self-propelled manner as well as with a method therefor.

BACKGROUND

Today, flat roofs are prior art in industrial as well as residential buildings. Insulating layers (e.g. insulating foams, insulating panels, glass and rock wool) are thereby typically applied to a statically load-bearing subsurface of profiled metal sheets, a wooden substructure or concrete surface, and they are covered with sealing membranes, which are laid in the form of webs. On the one hand, these sealing webs (in the alternative also referred to as material web, roofing sheet, roof film, film web) need to be welded to one another on the seams, on the other hand, they also need to be fastened to the subsurface, because any air flow, which sweeps across the surface, effects a buoyancy, which lifts the sealing web. The initially common seal fastening provided for only the seam of the sealing web, which had just been laid, to be fastened to the support structure through the packet of insulating layers. The next web is then welded to the prior web to overlap in such a way that the fastening points of the prior web are also covered under the new sealing web. To reduce the number of the sealing webs and thus the running meters of welding seams, sealing webs of increasing widths were used, which, however, moves the fastening seams further and further apart from one another.

The field fastening was thus developed as alternative for the seal fastening. In the case of a laying method, which is known on the market, the fastening elements of the insulating layers are thereby also used. These fastening elements often consist of long screws or bolts, the first end of which is introduced into the substructure and which, on the other (second end), have a head comprising a washer-shaped widening, which bears on the insulating layer and secures the latter. These head disks or load distribution disks, which have a diameter of several centimeters, preferably made of metal, distribute the tension, which emanates from the fasteners, which are attached in a punctiform manner, in a flat manner. The head disks are suitable as fastening points for the films (material webs); for this purpose, they are coated with a thermoplastic or with a hot-melt adhesive material. After the fastening of the insulating layers, the roof films or sealing webs, respectively, can be unrolled. At those locations, where the head disks are located, the metallic head disk is heated through the web by an induction unit, whereupon the applied adhesive effects a flat heat seal between the underside of the sealing web and the head disk.

It is a secondary condition hereby that a contact pressure needs to be ensured during the cool-down phase to achieve an intensive and resilient adhesion.

In response to the manual laying according to the above-described method, the position of the head disk below the sealing web is determined by a sensor (inductively, magnetically, . . . ) and the induction heater is placed accurately. After the heat-up phase or after successful welding process, respectively, the heater is replaced by a cooling element. This can be a simple metal body, which, due to its mass, ensures the contact pressure and serves to dissipate heat. The cooling element can also comprise a magnet, which supports the holding and clamping process. It is a disadvantage that the processing process requires a plurality of cooling elements, which need to be installed according to progress and which need to be gathered up again after the cool-down phase.

Further known problems are that the locating of the head disks, which are invisible below the seal, is extensive and that the placement of the induction unit as well as of the cooling elements requires experience. It is possible to overlook head disks because they cannot always be installed at regular intervals and patterns, because a roof surface can have lead-throughs, dormers, overhead lights, vents or other superstructures and installations.

This work, which is demanding and monotonous at the same time over a long period of time, with long wait times, thus quickly became the reason for efforts to automate the process.

PRIOR ART

Methods and robot-like devices, which transfer the above-described laying process to a mobile welding unit, have been described repeatedly in the prior art.

WO 2014/072324 describes a welding robot, which has a chassis comprising an electric drive, an induction welding device arranged on the chassis for the punctual welding of a material web with hot-melt adhesive-coated head disks. This prior art further reports a navigation system for controlling the position of a clamping and cooling device. The clamping and cooling device consists of a magazine for cooling elements comprising magnets of the type, which has already been described above. The welding robot according to this prior art places such a magnetic body onto the adhesive area after every welding process and moves to the next adhesive point. This undisputedly quick process, however, has several significant disadvantages, which tremendously limit the suitability for daily use on the construction site.

(a) The magnetic cooling elements have a non-negligible weight. The welding robot thus needs to be able to take along and transport a large supply for a sensible period of use. This requires that the chassis, the motors and the bearing surface of the drive wheels are designed for this load. The surface load of the newly laid, not yet fastened material web must not be exceeded, the welding robot must also not distort the film web due to its dead weight.

(b) The supply of cooling elements in the welding robot thus needs to be restocked on a regular basis, which reduces the level of automation accordingly.

(c) If magnetic cooling elements are used, the construction of the placing unit as well as of the magazine needs to be designed in such a way that the cooling elements do not adhere magnetically to one another and that a safe removal and placement is ensured.

(d) The chassis of the robot needs to be designed in such a way that it either has a clearance height, which makes it possible to move across the cooling element or that the cooling element is placed down outside of the chassis, e.g. at a lay-down device.

A further problem pertains to the position control. The welding robot according to the prior art needs to receive the position of the next head disks either from an external positioning system or needs to determine it by searching. A plurality of methods is known for the searching or for the subsequent navigating, respectively. If the welding robot has a precision GPS and if the position of the surface is determined accurately, the welding robot can move autonomously along the surface, which is to be treated. The navigation unit can determine and control for example the shortest/best route via optimization routines. The highly sophisticated software and the measuring of the working surface, which must be accurate, are disadvantageous hereby (e).

In the alternative, a welding robot could also use a random process, as it is known from lawnmower robots or floor cleaning equipment. The robot thereby moves forward in a straight line, until it hits an obstacle or a boundary line, turns at that spot by a certain angle and continues to move. This process is very simple but requires that the wheels of the working surface are marked cleanly. However, serious disadvantages are that (f) a plurality of trips need to be made at random to adequately ensure that every area of the surface, which is to be worked, has in fact been reached. In the case of a surface, which is provided with a plurality of ventilation openings, overhead lights and roof structures, the method is thus inefficient. In addition, it needs to be avoided simultaneously (g) that a head disk, which has already been worked, is detected and heated up a second time. In addition to the waste of time, this will not improve the quality of the adhesion, a repeated thermal loading of the roof film is undesirable. The welding robot would need to consequently have the ability to differentiate an already welded head disk from an unadhered head disk, which requires a special expenditure of sensors and evaluation logic.

Methods, which only remotely control the robot, and which determine the moving path externally, e.g., also require a high expenditure of equipment and software and are thus expensive.

SUMMARY

The present invention thus has the objective of solving the above-described problem and to introduce a practicable unit, which operates largely autonomously, for fastening sealing web. A method for fastening such sealing web is also described.

This object is achieved by a self-propelled fastening unit as well as a method having one or more features of the invention. Advantageous embodiments are described below and in the claims.

A method for fastening material webs 13, such as roofing sheets made of plastic takes place on a surface with fastening points 16 arranged thereon, wherein the fastening points 16 are embodied as metallic head disks 14 and have a hot-melt adhesive layer, which points to the material web 13. These elements are known from the prior art. The fastening points are the load distribution disks of the fasteners 15, by which the insulating sheets or elements 12 are held on the roof substructure 11. A self-propelled fastening unit 20 thereby carries out the following steps:

(A) detecting a route marking affixed to a surface by means of a first detector 22 on the fastening unit 20 and moving the fastening unit along the route marking.

The method according to the invention does not require any GPS measuring devices and also does not rely on a randomly controlled or computer-based search method, but uses a route marking, which had previously been affixed to the roof surface. However, this marking, which initially appears to be extensive, can be applied very easily and has multiple, specific advantages.

In a preferred case, the route marking can be a colored adhesive strip, which is temporarily or permanently adhered to the sealing web (roof film, roofing sheet, material web). Unrolling units for the simplified application are prior art, they can be applied quickly and in one operation by one worker alone when moving along the roof surface. Curves or courses, which bend at an angle, can also be realized without additional measures by such a unit. Routes, which run in parallel (to cover large surfaces) can be realized in an accurate and simple manner by laterally affixed spacers. The advantages are diverse: Corrections to the course can be made easily, obstacles can be planned optimally or can be bypassed as needed, and the adhesive strips can be removed and disposed of easily after completion. In addition, the route markings represent a safety feature, which should not be underestimated: The areas to be navigated are optically highlighted, critical locations (blockages by material or tool, possible crash sites) can be detected immediately, areas, which have not been covered yet, are visible. The planned driving direction of the fastening unit can be detected visually, which facilitates the delimitation of areas, in which workers are present. In addition, a plurality of independent routes can be realized via separate markings, which allows for the use of a plurality of fastening units at the same time in a very easy manner, without having to fear collisions. This can shorten the fastening time substantially. Last but not least, the marking and the subsequent fastening process can occur so as to be staggered in time according to the laying progress. The markings can furthermore be designed in different colors, which allows for the differentiation of different working areas.

If the route marking is affixed to the sealing web, as described, it lends itself that the first detector 22 uses an optical detecting method to detect the route. This can be a simple camera system, which differentiates the adhesive strip from the material web by means of contrast detection, a CCD line, which detects e.g. the reflected light of the roof surface, which is illuminated by a UV light-emitting diode upstream of the detector and which can differentiate the different levels of reflection of adhesive strip and sealing web.

As an alternative to adhesive strip, an application of paint is obviously also possible. If the paint is water-soluble and environmentally friendly, a removal of the marking may even be unnecessary.

In the alternative, a permanent route marking can also be applied invisibly below the material web, for example a wire or cable, which the first detector 22 finds with the help of an inductive, magnetic or capacitive detecting method. Even though the visual advantage of the easy removability is not present, this marking can instead also be used again at a later point in time to move along the roof surface. A use for cleaning equipment or other maintenance purposes would be possible. In the case of this type of route marking, the metallic head disks are furthermore plainly visible when affixing the marking, because the roofing sheet has not been laid yet. The route marking can thus be optimized correspondingly well.

The evaluation of the signals from the first detector occurs by software in a computer processor, which transfers corresponding control commands to a navigation unit. The navigation unit can also be realized as function of the computer or can be integrated therein, respectively.

While the first detector serves only for the orientation on the route, a second detector is responsible for (B) detecting a head disk 14 located below the material web and determining the position of the head disk 14.

For this purpose, the detector must be able to detect the head disk in a spatially resolved manner when moving past it. It turned out to be most efficient for this function to occur inductively by a single-line arrangement of metal detectors arranged across the vehicle width of the fastening unit. The signal reported by the sensors allows the detection of the position and expanse of the head disk and to store it as 2D "map". By comparing to setpoint profiles, it can even be determined whether the detected metal object is a head disk or a foreign object, which can be ignored. In a preferred embodiment, it is summarized as working step (B1):

(B1) detecting the position of the metallic head disk 14 relative to the fastening unit 20 by mean of a linear detector line (second detector 24), which is arranged linearly, transversely to the driving direction, formed from discrete inductions sensors 25.

In the case of known driving speed and known distance between second detector and the operating position of the induction welding unit, the distance Sr, which is to still be covered, or the driving time, respectively, can be determined. This will be summarized below as preferred, further execution step (B2):

(B2) calculating the driving distance Sr, which is still required, along the route marking until a first operating position of the fastening unit 20 is reached.

This information makes it possible to realize the process step (C):

(C) approaching and remaining at an operating position during the fastening process (D)-(F).

Thereby in particular as intermediate steps (C1) moving the fastening unit 20 by the distance Sr (C2) stopping the fastening unit 20.

Operating position hereby means that the working unit can reach the head disk with all of the tools, which are necessary for the fastening process (heating, cooling, . . . ). The best way to achieve this is when these tools are movably arranged inside the working unit and when they can be moved in x-, y- and z-direction in a motor-controlled manner. X-direction thereby refers to a movement in the longitudinal vehicle axis ("in driving direction") and the y-direction transversely thereto, in each case in a plane parallel to the roofing sheet or parallel to the working area, respectively. In a cartesian reference system, the z-direction would consequently be the movement orthogonally to the working area, would thus correspond to the approaching of or distancing from the roofing sheet. An x/y/z movability is thereby not mandatory, it could also be an adjustable cantilever arm, which rotates about a fixed point (a system based on polar coordinates). This fine positioning consequently allows for the (D) positioning an induction heater 30 and heating up the head disk 14 for a period of time Th.

In a refined embodiment of step (D), the positioning of the induction heater can be made more precise, in that the information from step (B1) is only used as a first approach:

(D1) positioning a fine measuring device (39) by the information from step (B1) above the first operating position.

If, e.g., a further measuring device or fine measuring device 39, respectively, is provided as tool, the exact position of the head disk can be determined even more accurately. This may be necessary, because the drive control of the fastening unit 20 is not precise and the location information about the head disk can be missed easily. Since the induction heater can ensure an efficient heating only in response to an exact positioning, a positioning accuracy in the low single-digit millimeter range as compared to an accuracy in the centimeter range has a significant impact on the quality of the connection of roofing sheet and head disk. The fine measuring device can preferably be realized as a set of induction measuring coils in a circular manner on the circumference of the cooling element. When the measuring signal of all sensors is substantially identical, the position is centered. Deviations of the sensor signals indicate the movement in a spatially resolved manner. This sensor data thus allows for the (D2) making the determined first operating position more precise by means of the information from the fine measuring device (39) and determine a second, more precise operating position.

The induction heater 30 can now consequently be aligned better and (D3) can be positioned on the second operating position.

As a consequence, the last step will correspond to the above-described process step (D)

(D4) heating up the head disk (14) for a period of time Th.

Depending on the design of the heater, "positioning" in (D) or (D3), respectively, refers to a "direct placement" onto the material web or a "holding at a defined distance". The period of time Th is thereby determined by the output of the induction heater, the type of the adhesive, the ambient temperature and other factors. The period of time can be fixedly predetermined or can be determined dynamically by a control circuit by in-situ temperature measurement. If the hot-melt adhesive has liquefied sufficiently, the next process step takes place:

(E) removing the induction heater 30 and pressing the material web against the head disk by means of a cooling device 32.

The replacing of the induction device by a cooling device at the same location can be achieved by the same mechanism, which made it possible to place down the induction heater. Pressing on the material web by the cooling device can occur by the dead weight of the cooling device, can be supported magnetically or electromagnetically and/or can be achieved by he lowering mechanism (z-direction), which utilizes the dead weight of the fastening unit as counter weight. After a cool-down time Tk, which, in turn, is predetermined or dynamically measured by different parameters, (F) the cooling device can be taken off.

The fastening process for a head disk is thus concluded. The fastening unit can continue its drive along the route marking. This is described in process step (G) continuing with (A), until an end of the route marking is reached.

The comparison of the prior art with the above-described method makes it clear that, in the case of this fastening method, it could be considered to be disadvantageous in spite of the described advantages that the fastening unit needs to wait for the "passive" cool-down step, because provision is in fact not made for a magazine comprising cooling elements, which can be placed down. If, however, one or a plurality of fastening units utilize for example the night time and work a large surface autonomously, this waiting cool-down time is less important—the independence from cooling elements, which need to be brought along and which can be placed down, is then even a requirement.

Should it be necessary, however, for example due to a foreseeable weather change, to accelerate the fastening process, the method can be shortened, in that the working unit simply leaves out steps (E) and (F). The attachment of the cooling elements would then need to take place manually, the working unit would already work the next adhesive location in the typically necessary cool-down time. It is important to emphasize that the working unit can reach such a fast speed simply by a simple program variation, without having to convert the unit itself for this purpose.

When focusing on the fastening unit itself and on its technical components or significant technical features, respectively, it needs to be designed and able to perform a method as described above. For this purpose, a self-propelled fastening unit 20 will need a chassis comprising at least one electric motor, which acts on wheels 26, 27, caterpillars or other drive means. The term "self-propelled" hereby means that it has its own drive, but cannot necessarily work completely autonomous, but controlled by its computer unit and by externally specified parameters. The term chassis refers to all drive alternatives, which are known in the prior art, such as axle drives, single-wheel drives, chain and caterpillar drives or combinations thereof. In addition to the known wheels, wheels also comprise so-called omni-wheels, which make it possible to turn on the spot on location. Depending on the design of the fastening unit, a person of skill in the art will choose the matching alternative.

As tools in the above-used context, the fastening unit comprises at least one induction heater 30 for heating up a metallic head disk 14 and a cooling device 32 for pressing on and cooling an adhesive location between a material web 13 and the metallic head disk 14. These two tools are responsible for the core function for the fastening unit. A first detector 22 for detecting a route marking and a further, second detector 24 for detecting the position of a head disk, serve for the orientation and navigation of the unit. The function of these two detectors has been described in detail above.

For orientation or for driving on the working area, respectively, the fastening unit further comprises a navigation system and at least one computer processor for evaluating detector signals, for determining drive signals and for controlling the fastening process. Strictly speaking, the navigation device thus comprises the engine control and sensors or actuators, respectively, which are responsible and necessary to detect and monitor the driving behavior of the unit.

As described above in the method part, it makes sense to place the induction heater and the cooling device as accurately as possible above the determined location of the head disk. If induction heater 30 and cooling device 32 were attached stationarily in the fastening unit, the entire unit would need to be designed for fine positioning. This, however, is more extensive than providing an additional positioning system 36, 38, which allows for a fine orientation of the induction heater 30 or of the cooling device 32, respectively, while the fastening unit 20 itself remains in the operating position. The fine positioning thus occurs in or on the fastening unit itself. It would be much preferable to provide a positioning system 36, 38, which allows the fine orientation in all three cartesian spatial axes. The orientation in x-y-z direction also allows the lifting and lowering of the tools. It is furthermore advantageous to design the positioning system 36, 38 in such a way that it is able to press the induction heater 30 or the cooling device 32, respectively, on a setpoint position with defined contact pressure. It can thus be ensured that the best welding of roofing sheet and head disk is achieved even in the case of non-perfect flatness of head disk to tool.

The cooling device plays an important role in the entire working time. As explained above, the strength of the adhesion or welding, respectively, also depends on the tightness of the contact between material web and head disk, because it can be ensured through this that the flat adhesion or welding, respectively, occurs as completely as possible. In the simplest case, a passive cooling element is thus chosen as cooling device 32. On principle, this requires a large mass to ensure the heat dissipation. It is possible in a further development to use a cooling element comprising a fluid- or gas-supported, active cooling. This refers to a re-cooling of the cooling element by a liquid-based circulation system, a cooling by expansion of a compressed gas, an electric fan or an electric cooling, by Peltier elements.

To further improve the above-described fine positioning, it can be advantageous to affix at least a third detector 39 or a set of detectors 39a-d to the cooling device 32, which are in a feedback loop with the positioning system and which support the fine positioning as fine measuring device 39.

The affixing to the cooling device makes sense for 3 reasons: First of all, no further tool station is required, which needs to be positioned. Due to the fact that the last process step of the fastening is the cool-down and the first one is the fine position determination, the tool, which is used last, can also be used as the first. Last but not least, possible disturbances of the heating-induction coil can thus be reduced. Should this not be important for the sensor, the third detector 39 or set of detectors 39a-d can also be arranged around the induction heater 30.

So that the fine positioning needs to only be carried out once for all tools, it is advantageous to install the induction heater 30 and the cooling device 32 in a rotatable revolver device 34, which makes it possible to position the induction heater 30 or the cooling device 32 above the same setpoint position on the surface in an alternating manner by means of a rotation, without moving the fastening unit 20 itself or the positioning system 36, 38. In the logic of the above-described x/y/z coordinates, a rotation around the z-axis is thus present. In a further development, the revolver could also be designed or enlarged, respectively, in such a way that it has more than 2 positions. If a further position is available, it can be used to accommodate a marking device, a measuring platform or means for quality testing. These can be optical or mechanical tests, documentation tasks or markings, which verify the position and the completion.

A supply with electrical energy is required implicitly for all of the above-described alternatives of the working unit. This can take place in the known way by means of accumulators, which are brought along, plus possibly solar cells on the upper side of the unit, or by a trailing cable as connection to the public power supply system.

BRIEF DESCRIPTION OF THE DRAWINGS

The invention will now be briefly explained in an exemplary manner with reference to the accompanying drawings.

FIG. 1 shows a schematic roof structure, as it is known in the prior art; and

FIG. 2 shows a working unit in a view from below.

DETAILED DESCRIPTION

FIG. 1 shows a roof structure 10 comprising a roof substructure 11 (wood, metal construction, concrete, . . . )

and an insulating layer 12 affixed thereto. This insulating layer is anchored in the substructure 11 by fasteners 15. On their upper end, which bears on the insulating layer 12, the fasteners have load distribution disks or head disks 14(a-c), which are to serve as fastening points 16(a-c) for a material web 13, which is laid out above it.

FIG. 2 shows a fastening unit 20 from below according to the invention described here. The general moving direction (operating direction) is suggested by the arrow shown to the right thereof. The fastening unit 20 has a chassis comprising wheels 26a, b and 27a, b. The chassis can be designed in the known way and have individual wheel control such that the fastening unit 20 has the tightest possible turn radius. For this purpose, 2 or all wheels can be embodied to be pivotable. A first detector 22 (CCD line, camera, optical detector for certain wavelengths, magnetic field or metal sensor, . . . ), the signal of which serves the purpose of detecting a possible deviation of the operating direction from the route marking, serves for the orientation on a route marking. A second detector 24 is shown as line-shaped detector, formed from discrete induction sensors 25. It serves to detect metal, such as the mentioned head disks 14.

In a positioning system 36, 38, which can be moved by x-y direction, a cooling station 32 and an induction heater 30 can be moved inside the perimeter of the chassis, as suggested by the two double arrows. The fine orientation of these tools to a position, at which a head disk 14 is suspected in the subsurface, is thus possible. The tools can be rotated on a revolver device 34 and can thus work the same position one after the other. Further detectors 39a-d, which can support a fine positioning, can be affixed to the cooling device.

The features of the invention disclosed in the above description, in the drawings as well as in the claims, can be significant for the realization of the invention, both individually and in any, yet technically sensible or advantageous combination, respectively. A non-explicit illustration of a combination of features does not mean that such a combination is not meaningful or not possible. Vice versa, a joint illustration of features does not mean that a structural and/or functional connection always exists between the features.

LIST OF REFERENCE NUMERALS

Features, which appear identically several times, are identified with letters a, b, c.
10 roof structure
11 (roof)substructure
12 insulation, insulating layers or blocks, damp course
13 film(s), roof film, material web, sealing web
14 (metallic) head disk(s)
15 fastener
16 fastening point(s)
20 fastening unit, self-propelled, fastening device
22 first detector
24 second detector, detector line
25 induction sensor
26, 27 wheels
30 induction heater
32 cooling device
34 rotatable revolver device
36, 38 additional positioning system, in x (36)- and y-direction (38)
39 fine measuring device, third detector, set of detectors

The invention claimed is:

1. A method for fastening material webs located on a surface to fastening points arranged beneath the material webs, the fastening points being embodied as metallic head disks including a hot-melt adhesive layer directed toward the material web, the method comprising:
providing a self-propelled fastening unit;
(A) detecting a route marking affixed to the material webs or the surface by a first detector on the fastening unit and moving the fastening unit along the route marking;
(B) detecting a head disk located below the material web by a second detector and determining a position of the head disk;
(C) the self-propelled fastening unit approaching and remaining at an operating position in order to carry out a fastening process which includes:
(D) positioning an induction heater of the self-propelled fastening unit and heating up the head disk for a period of time Th;
(E) removing the induction heater and pressing the material web against the head disk by a cooling device of the fastening unit;
(F) taking off the cooling device after a predetermined time Tk; and
(G) the self-propelled fastening unit repeating steps (A)-(G), until an end of the route marking is reached.

2. The method according to claim 1, wherein the route marking is affixed to the material web and the method further comprises the first detector on the fastening unit including an optical sensor for detecting the route marking.

3. The method according to claim 1, wherein the route marking is affixed below the material web and the method further comprises the first detector on the fastening unit including an inductive, magnetic or capacitive sensor for detecting the route marking.

4. The method according to claim 1, further comprising, the process steps (B)-(D) including:
(B1) detecting the position of the metallic head disk relative to the fastening unit by a linear detector line which forms the second detector, which is arranged linearly, transversely to a driving direction, formed from discrete inductions sensors;
(B2) calculating a driving distance Sr, which is still required, along the route marking until a first operating position of the fastening unit is reached;
(C1) moving the fastening unit by the distance Sr;
(C2) stopping the fastening unit;
(D1) positioning a fine measuring device by information from step (B1) above the first operating position;
(D2) increasing a precision of the determined first operating position using information from the fine measuring device and determining a second, more precise operating position;
(D3) positioning the induction heater on the second, more precise operating position; and
(D4) then heating up the head disk for the period of time Th.

5. A self-propelled fastening unit for carrying out the method according to claim 1, comprising:
a chassis;
at least one electric motor on the chassis;
wheels or caterpillar tracks attached to the chassis that are drivably connected to the at least one electric motor;
an induction heater for heating up a metallic head disk supported by the chassis;
a cooling device for pressing on and cooling a connection point between a material web and the metallic head disk supported by the chassis;
a first detector supported on the chassis that is adapted to detect a route marking;

a second detector supported on the chassis that is adapted to detect a position of a head disk;

a navigation system adapted to control a movement of the fastening device;

at least one computer processor configured to evaluate signals from the first and second detectors, to generate drive signals, and to control the fastening process using the induction heater and cooling device.

6. The self-propelled fastening unit according to claim 5, further comprising an additional positioning system configured to provide a fine orientation of at least one of the induction heater or the cooling device, respectively, while the fastening unit remains in the operating position.

7. The self-propelled fastening unit according to claim 5, wherein the positioning system provides for fine orientation in all three cartesian spatial axes.

8. The self-propelled fastening unit according to claim 5, wherein the positioning system is adapted to press at least one of the induction heater or the cooling device, respectively, on a set point position with a defined contact pressure.

9. The self-propelled fastening unit according to claim 5, wherein the cooling device is a passive cooling element.

10. The self-propelled fastening unit according to claim 5, wherein the cooling device is a cooling element comprising a fluid-supported, gas-supported or electrically active cooling.

11. The self-propelled fastening unit according to claim 5, further comprising a third detector or set of detectors affixed to the cooling device, which are connected in a feedback loop with the positioning system and act as a fine measuring device to allow a fine positioning.

12. The self-propelled fastening unit according to claim 5, wherein the induction heater and the cooling device are installed in a rotatable revolver carrier, which allows positioning of the induction heater or the cooling device above a same setpoint position on the surface in an alternating manner by a rotation of the rotatable revolver carrier, without movement of the fastening unit itself or the positioning system.

13. The self-propelled fastening unit according to claim 5, wherein the rotatable revolver carrier has at least one further position adapted to receive a marking device, of a measuring platform or a quality testing device.

14. The self-propelled fastening unit according to claim 5, further comprising a third detector or set of detectors arranged around the induction heater.

* * * * *